128-661.01 EX

M8973 OR RE 32,323

United States Patent [19]

Bom

[11] E Patent Number: Re. 32,323

[45] Reissued Date of Patent: Jan. 6, 1987

[54] HEART EXAMINATION BY MEANS OF ULTRASOUND WAVES

[75] Inventor: Nicolaas Bom, Berkenwoude, Netherlands

[73] Assignee: Organon Teknika B.V., Oss, Netherlands

[21] Appl. No.: 676,794

[22] Filed: Nov. 30, 1984

Related U.S. Patent Documents

Reissue of:

[64] Patent No.: 3,789,833
Issued: Feb. 5, 1974
Appl. No.: 237,286
Filed: Mar. 23, 1972

U.S. Applications:

[63] Continuation of Ser. No. 207,805, Nov. 17, 1980, abandoned, which is a continuation of Ser. No. 573,338, Apr. 20, 1975, abandoned.

[51] Int. Cl.[4] ..... A61B 10/00

[52] U.S. Cl. ..... 128/660

[58] Field of Search ..... 128/660–663

[56] References Cited

U.S. PATENT DOCUMENTS

| | | | |
|---|---|---|---|
| 2,628,335 | 2/1953 | Drake | 73/67.7 |
| 2,700,895 | 2/1955 | Carson | 73/67.6 |
| 3,279,242 | 10/1966 | Megoloff | 73/67.8 S |
| 3,548,642 | 12/1970 | Flaherty et al. | 128/660 |
| 3,561,430 | 2/1971 | Filler, Jr. et al. | 128/2.05 Z |
| 3,577,772 | 5/1971 | Perilhou | 128/2 V |
| 3,605,724 | 9/1971 | Flaherty | 128/2 V |
| 3,624,744 | 11/1971 | Munger | 128/2 V |

OTHER PUBLICATIONS

Buschmann, "Ultrasonics", Jan-Mar. 1965, pp. 21-25.

*Primary Examiner*—William E. Kamm
*Attorney, Agent, or Firm*—Roberts, Spiecens & Cohen

[57] ABSTRACT

An examination of the human heart is carried out by means of ultrasound waves emitted by piezo-electric crystals. The crystals are inserted in a holder adapted to be placed on the body of a patient; they are arranged in a row and have parallel axes of radiation. The crystals are cyclically excited at a high scanning frequency, and the echo signals reflected by the heart walls and received by the crystals are displayed on the screen of a cathode ray tube to obtain a cross-sectional picture of the heart. In a modification of the invention, the holder comprises two or more rows of crystals radiating at different angles; in this case the echo signals related to a common point of the heart wall are superposed on the screen of the cathode ray tube by means of a coordinate transformation.

11 Claims, 8 Drawing Figures

HEART EXAMINATION BY MEANS OF ULTRASOUND WAVES

Matter enclosed in heavy brackets [ ] appears in the original patent but forms no part of this reissue specification; matter printed in italics indicates the additions made by reissue.

*This is a continuation on, application Ser. No. 207,805 filed Nov. 17,1980 abandoned which is a continuation of Ser. No. 573,338, filed Apr. 20, 1975 and now abandoned, which is a Reissue of Pat. No. 3,789,833 granted Feb. 5, 1974 based on application Ser. No. 237,286 filed Mar. 23, 1972.*

BACKGROUND OF THE INVENTION

The invention relates to an apparatus for heart examination by means of ultrasound waves generated by piezo-electric crystals, wherein the dimensions of the heart are derived from the times at which the crystals receive the echo signals reflected by the heart structure.

Dutch Patent application Ser. No. 6804410, laid open to public inspection, discloses an apparatus of this kind, wherein a catheter carrying on its end two piezo-electric crystals with opposite directions of radiation is introduced into the heart of a patient.

The fact that the known apparatus involves the introduction of a catheter into the heart constitutes, in practice, a considerable disadvantage, because it restricts the use of the apparatus to clinical application. A further disadvantage is the limited character of the information obtained, since only two points on a straight line are observed.

BRIEF SUMMARY OF THE INVENTION

It is, accordingly, a main object of the invention to provide an apparatus by means of which the heart function may be examined without the necessity of any operative intervention.

A further object of the invention is to provide an apparatus for heart examination giving a more extensive information about the dimensions of the heart than the known apparatus.

A further object of the invention is to provide a compensation for the intensity difference between the echo signals reflected by the front wall and back wall of the heart in order to get a better display on the screen of a cathode ray tube.

A further object of the invention is to get a satisfactory display of the portions of the heart perpendicular to the body surface by means of crystals radiating at different angles.

According to the invention, a holder adapted to be externally placed on the body of a patient comprises a plurality of crystals arranged in a row and having parallel axes of radiation, which are cyclically excited at a high scanning frequency, and the echo signals are displayed on the screen of a cathode ray tube in a coordinate system in which one coordinate indicates the position of the crystal in the holder, and the other one the time of reception of the echo signals.

In the simplest embodiment of the apparatus according to the invention, the active faces of the crystals lie in a common plane substantially coinciding with the body surface of the patient when the holder is placed on this surface.

In general, the echo signal produced by the front wall of the heart will be considerably stronger than the echo signal produced by the back wall, which is disadvantageous to a clear display of the echo signals. This difficulty may be removed by means of an embodiment wherein the cyclic excitation of the crystals is controlled by a clock generator, and wherein the echo signals are amplified in an amplifier also controlled by the clock generator and having a time dependent gain compensating for the intensity difference of the echo signals produced by the front wall and the back wall of the heart.

The above-mentioned simple embodiment of the apparatus according to the invention has the disadvantage that the portions of the heart structure perpendicular to the body surface are not clearly displayed on the screen of the cathode ray tube, because the ultrasound waves impinge on those portions at an unfavourable angle. This restriction may be reduced by inserting in the holder at least two subsequently excited groups of crystals in such manner that the axes of radiation of the crystals of one group include an angle with those of the crystals of the other group. Preferably, three groups of crystals are used, in such manner that the axes of radiation of the crystals of the first group are substantially perpendicular to the body surface of the patient, and that the axes of radiation of the two other groups include equal and opposite angles with the body surface of the patient.

The echo signals obtained by means of the various groups are superposed on the screen of the cathode ray tube; for this purpose, a coordinate transformation must be applied to the deflecting signals of the cathode ray tube for the groups with an inclined direction of radiation. If, for the crystals radiating at right angles to the body surface, the vertical deflecting signal is a step function indicating the position of the crystal in the group, and the horizontal deflecting signal is a time indicating saw tooth signal, the coordinate transformation for the crystal groups with inclined directions of radiation may be realized by adding to the step function a signal obtained by multiplication of the saw tooth signal by a factor proportional to the [sinus] *sine* of the angle of radiation, and by using for the horizontal deflection a signal obtained by multiplication of the saw tooth signal by a factor proportional to the [cosinus] *cosine* of the angle of radiation.

If the three crystal groups are juxtaposed in the holder in such manner that each set of corresponding crystals of the three groups forms a straight line perpendicular to the row direction, the above-described coordinate transformation provides for a satisfactory superposition of the echo signals.

However, it is also possible to arrange the crystals of the various groups in the holder in such manner that corresponding crystals are displaced with respect to each other in the row direction. This situation occurs, for instance, if the crystals of the groups are combined into a single row. In this case, a further signal compensating for the mutual displacement of the groups must be added to the vertical deflecting signal.

Preferably, the coordinate transformation of the deflecting signals is controlled by a program circuit also controlling the alternate excitation of the groups.

SHORT DESCRIPTION OF THE DRAWINGS

DETAILED DESCRIPTION

Figure 1:
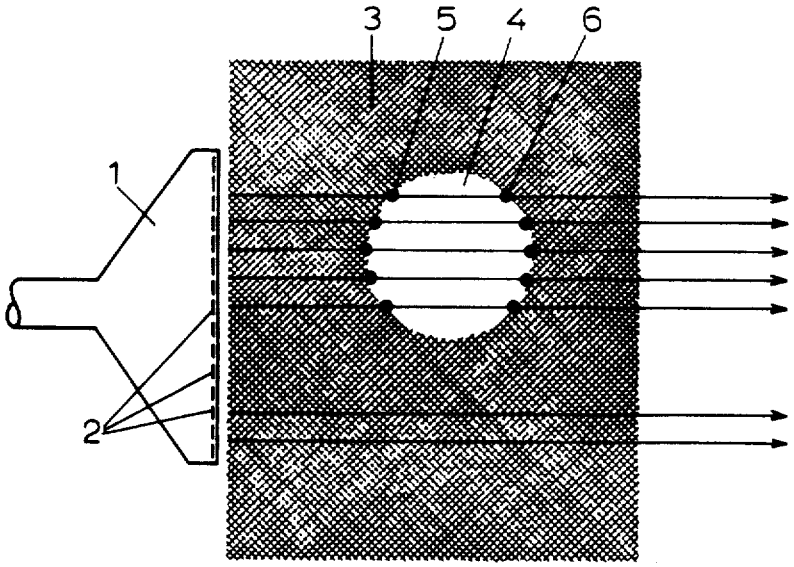
FIG. 1 shows the crystal holder of an apparatus according to the invention, placed on the body of a patient, the heart being schematically indicated by a circle.

FIG. 1 shows a crystal holder 1 comprising a plurality of piezo-electric crystals 2 arranged in a row. The number of crystals is determined by the desired resolution, and may amount to 20, for instance. The crystals may have the shape of circular plates of which the active faces lie in a common plane. This plane lies entirely on the outside of the holder, so that it coincides substantially with the body surface when the holder is placed on the body of a patient; for this reason, only a simple transfer medium is necessary between the crystals and the body surface.

In FIG. 1, the body of the patient is schematically indicated at 3, and the circular area 4 represents the heart. The ultrasound waves emitted by a certain crystal are reflected by the front wall of the heart in a point 5, and by the back wall of the heart in a point 6, so that the crystal in question receives two subsequent echo signals.

The crystals 2 are excited in a cyclical order at a high scanning frequency, for instance in such manner, that each crystal is excited 190 times per second.

Figure 2:
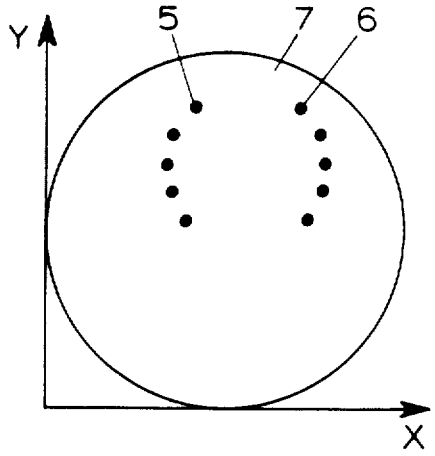
FIG. 2 shows the representation obtained by the display of the echo signals on the screen of the cathode ray tube.

The received echo signals are displayed, as shown in FIG. 2, on the screen 7 of a cathode ray tube. The vertical deflection of the cathode ray occurs step by step in such manner that the location of each displayed point corresponds with the position in the holder of the crystal receiving the echo signal, while the horizontal deflection occurs as a function of time in such manner that the location of each displayed point corresponds with the time at which the echo signal was received.

In FIG. 2, the direction of the horizontal deflection has been indicated by X, and the direction of the vertical deflection by Y.

The representation obtained on the screen of the cathode ray tube corresponds with a horizontal cross-section of the heart, in which all displacements, for instance of the heart wall, may be clearly observed. In general, the received echo signals have the greatest intensity when the ultrasound waves impinge on the heart wall at right angles. Due to the movements of the heart wall, it may occur at certain times that the ultrasound waves impinge on the heart wall at an unfavourable angle, whereby the displayed echo signal is attenuated or even completely suppressed. However, the interpolating action of the eye makes it impossible to perceive such attenuations or interruptions, so that a clear picture of the movements of the front and back walls of the heart is obtained. In portions of the heart wall in parallel with the X-axis, the angle of incidence of the ultrasound waves is [alwaysunfavourable] *always unfavourable*, so that these portions cannot be clearly displayed. If desired, this restriction may be removed by the use of crystals radiating at different angles, as will be further explained hereinafter.

Figure 3:
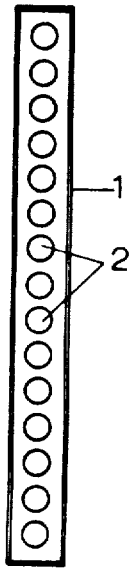
FIG. 3 shows a bottom view of the crystal holder and the crystals arranged in the same.

FIG. 3 shows a bottom view of the crystal holder and of the crystals arranged in the same.

Figure 4:
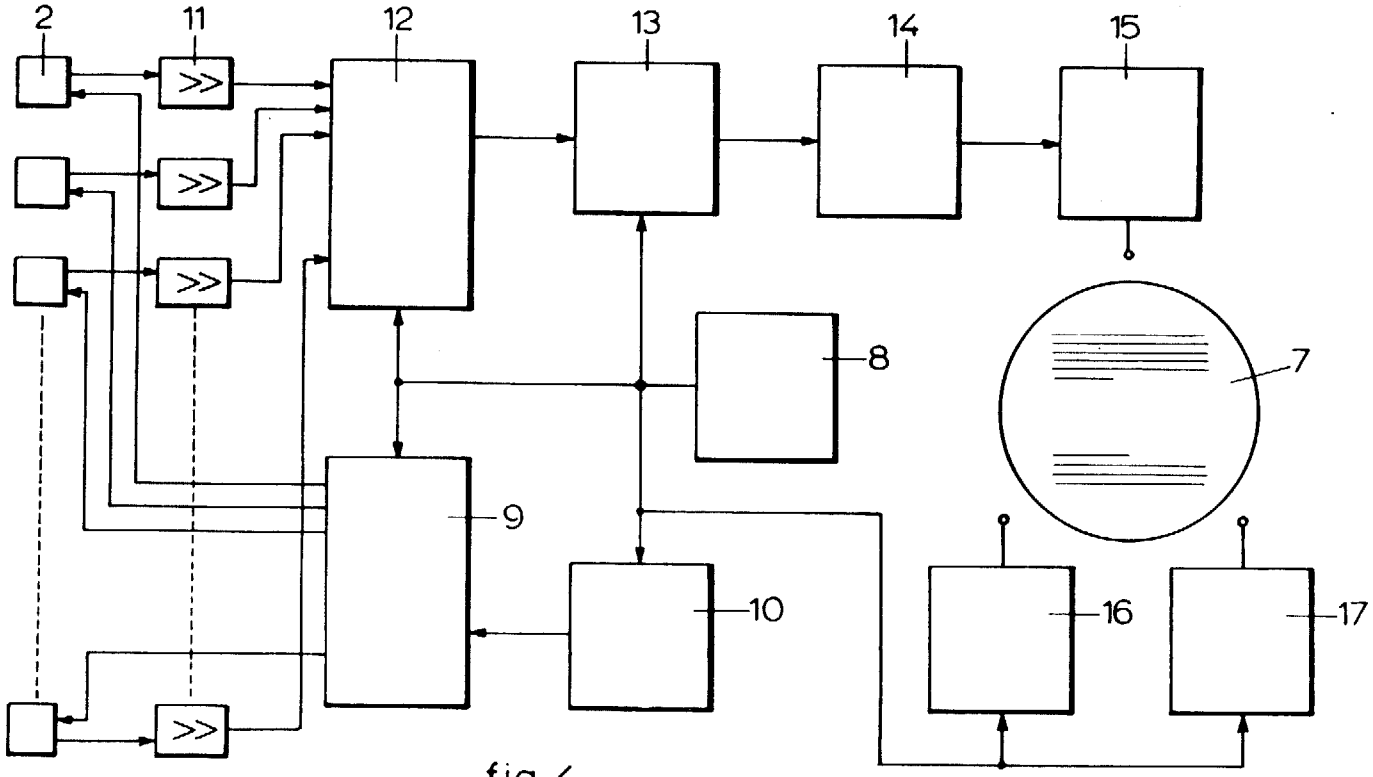
FIG. 4 shows a block diagram of the circuit of an apparatus according to the invention.

FIG. 4 shows a block diagram of the circuit of an apparatus according to the invention in which a crystal holder as shown in FIGS. 1 and 3 is used. The circuit is controlled by a clock generator 8, whereby the crystals 2 are excited in a cyclic order. For this purpose, the clock generator controls an electronic switching member 9 of which the output terminals are each connected with one of the crystals 2. An oscillator 10, also controlled by the clock generator 8, generates the oscillations for the excitation of the crystals, which may have a frequency of the order of 1–10 megacycles. The echo signals received by the crystals are supplied, each through an associated pre-amplifier 11, to an electronic switching member 12, also controlled by the clock generator 8, and connecting the crystals in a cyclic order with the amplifier 13. The amplifier 13 has a time dependent gain, and is likewise controlled by the clock generator 8 for this purpose. The gain varies in such manner that it increases progressively during the excitation interval of each crystal, so that the echo signal produced by the back wall of the heart is amplified to a greater extent than the echo signal produced by the front wall of the heart. This provides a compensation for the difference of the intensities of the two echo signals. The output signals of the amplifier 13 are supplied through a detector 14 to a modulator 15 producing an intensity modulation of the cathode ray.

The vertical deflection of the cathode ray is obtained by means of a progressively increasing step signal produced by a step generator 16 controlled by the clock generator 8. Thus, the vertical position of the cathode ray corresponds at any time with the position of the active crystal in the holder. The horizontal deflection is obtained by means of a saw tooth signal generated by a time base 17, likewise controlled by the clock generator 8. Thus, the horizontal position of the cathode ray corresponds with the time passed since the beginning of the excitation of a crystal, so that each echo signal is displayed on the screen in a horizontal position corresponding with the time at which the echo signal was received by the crystal.

Figure 5:
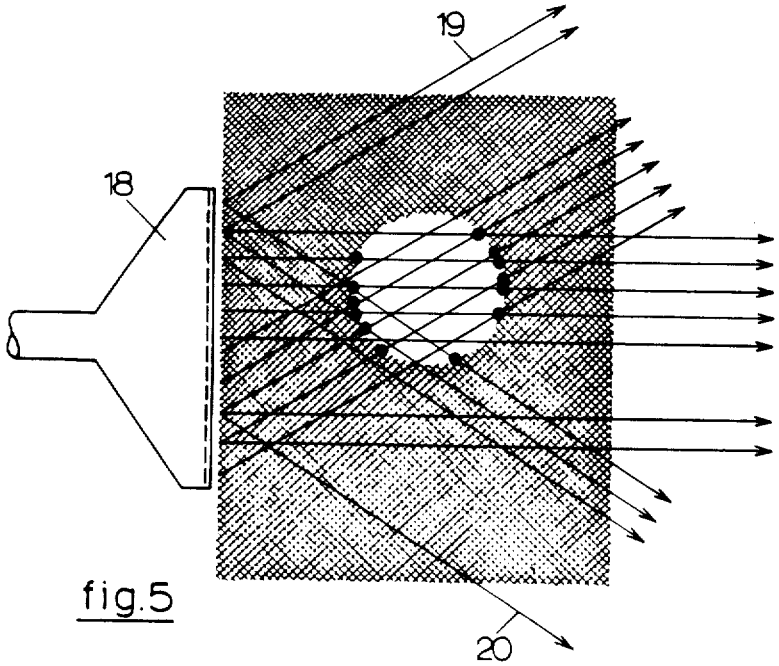
FIG. 5 shows a crystal holder with three crystal groups having different directions of radiation, placed on the body of a patient.

FIG. 5 shows a crystal holder 18 comprising three rows of crystals juxtaposed in a direction perpendicular to the place of the drawing. The crystals of one of the rows are arranged in the same manner as in the holder shown in FIG. 1, so that the axes of radiation are perpendicular to the body surface when the holder is placed on the body of a patient. Thus, this crystal group provides the same representation as the holder shown in FIG. 1. The crystals of the two other groups are arranged in such manner that the axes of radiation are inclined with respect to the body surface at equal angles, which are opposite for the two groups. The axes of radiation are indicated at 19 for one of the last-mentioned groups, and at 20 for the other one.

Figure 6:
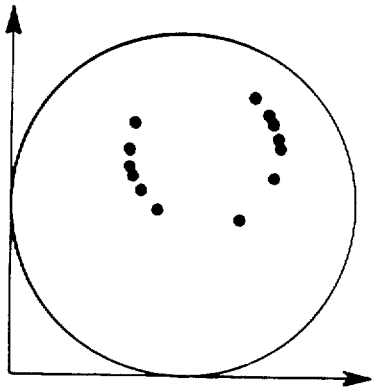
FIG. 6 shows a representation obtained by the display on the screen of the cathode ray tube of the echo signals obtained by means of the crystal holder shown in FIG. 5.

The echo signals are displayed on the screen of the cathode ray *tube* in such manner that echo signals relating to the same point of the heart wall are superposed. This provides for a representation of the kind shown in FIG. 6.

To obtain the superposition, it is necessary to apply a coordinate transformation to the deflecting signals of the cathode ray tube, as will be described hereinafter.

Figure 7:
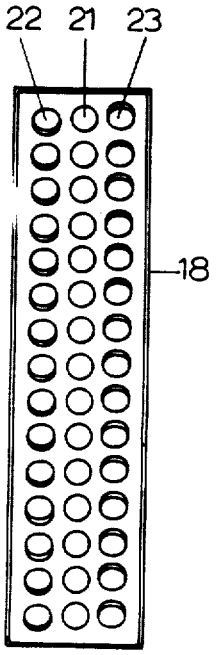
FIG. 7 shows a bottom view of the crystal holder according to FIG. 5 and of the crystals arranged in the same.

FIG. 7 shows a bottom view of the holder 18 from which it appears that the holder comprises three juxtaposed rows of crystals. The crystals of the middle row 21 will, in general, be arranged in such manner that the active faces lie in a common plane, as in the holder according to FIG. 1. The crystals of the outer groups 22 and 23 are arranged in the holder in such manner that their active faces are inclined at a certain angle, for instance of 15°, for the group 22, and at the same angle in the opposite direction for the group 23. In this case, it is inevitable that the inclined crystals are partially out of engagement with the body surface, so that it may be necessary to use a transfer medium; [vaseline] *Vaseline* or a soft synthetic rubber may be used for this purpose.

Figure 8:
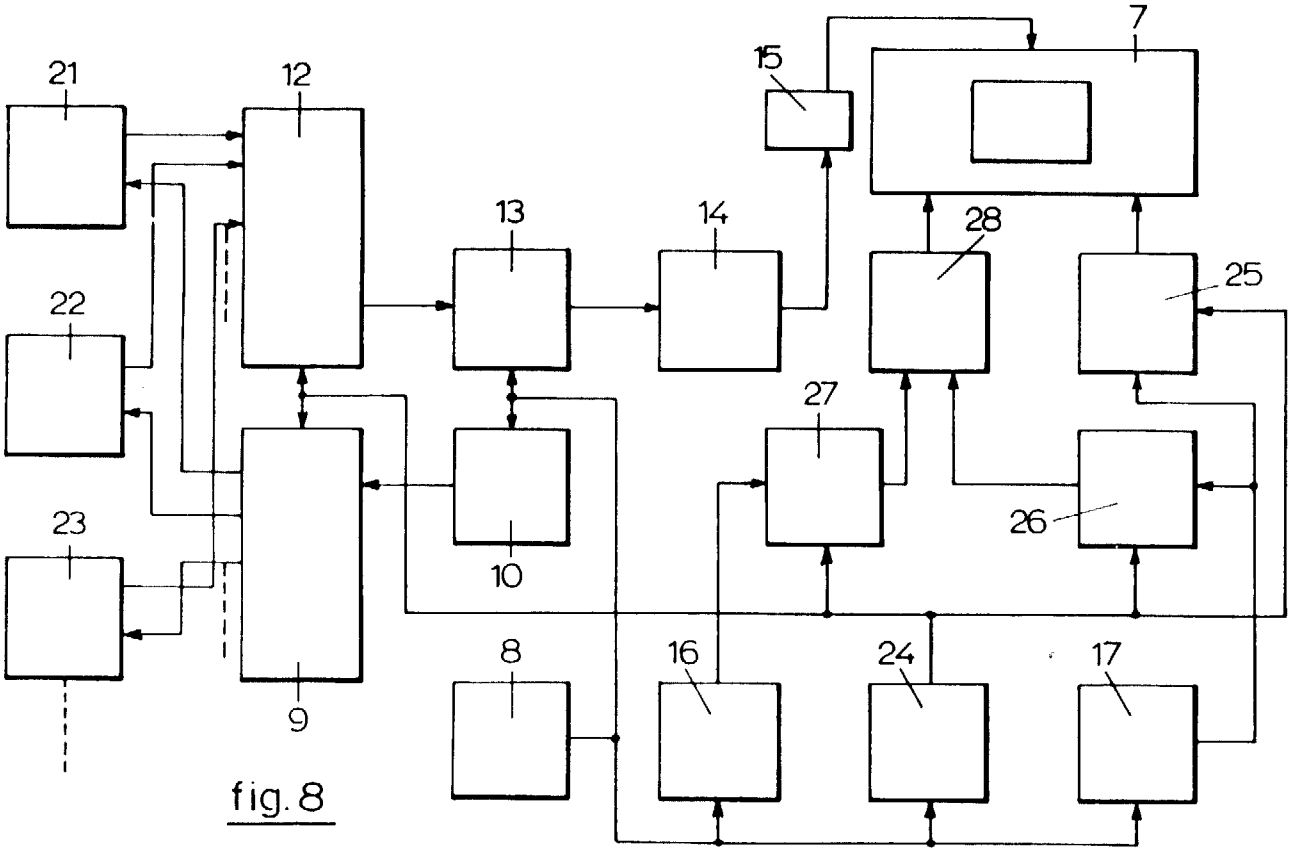
FIG. 8 shows a block diagram of the circuit of an apparatus according to the invention comprising a crystal holder with three crystal groups.

FIG. 8 shows the associated circuit diagram. The blocks 21, 22 and 23 represent the three crystal groups. These groups are subsequently excited, and the crystals of each group are actuated by the switching member 9 in the same manner as in the circuit according to FIG. 4. The switching member 12 serves to transmit the echo signals of each group subsequently to the amplifier 13. The subsequent excitation of the groups is controlled by a program circuit 24.

During the display of the echo signals produced by the inclined crystal groups 22 and 23, a coordinate transformation must be applied to the deflecting signals of the cathode ray tube. For this purpose, the program circuit 24 actuates a pair of amplifiers 25 and 26 and, if necessary, also a member 27 displacing the display point in the Y-direction. During the display of the echo signals of the groups 22 and 23, the saw tooth signal produced by the time base 17 is amplified by a factor proportional to cos $\alpha$ in the amplifier 25, and by a factor proportional to sin $\alpha$ in the amplifier 26, wherein $\alpha$ indicates the angle between the axes of radiation and the body surface. The output signal of the amplifier 25 controls the deflection in the X-direction, and the output signal of the amplifier 26 is added, in an adding member 28, to the step signal produced by the step generator 16.

When the crystal holder is constructed as indicated in FIG. 7, so that corresponding crystals of the three groups lie in a straight line in parallel with the short side of the crystal holder, the required coordinate transformation is completely realized by the above-mentioned method. However, it may be desirable under certain circumstances to displace corresponding crystals of the three groups with respect to each other in the longitudinal direction of the holder, for instance in such manner that the crystals of the two outer groups lie between the crystals of the middle group in a honeycomb pattern, or in such manner that all crystals of the three groups are arranged in a single row. In this case, means must be provided to compensate for the mutual displacement of corresponding crystals of the three groups. For this purpose, use is made of the chamber 27 which is actuated, if necessary, by the program circuit 24, and which adds a fixed amount to the step signal produced by the step generator 16 during the display of the echo signals of the groups 22 and 23; the added amount may be either positive or negative, according to circumstances.

I claim:

[1. Apparatus for heart examination by means of ultrasound waves, comprising:

a. a crystal holder adapted to be externally placed on the body of a patient;

b. a first group of piezo-electric crystals supported in said holder, said crystals being arranged in a row and having an active surface lying in a common plane on the outside of the holder, said crystals having parallel axes of radiation lying in a plane adapted to intersect the heart being examined along a predetermined cross-section and forming both as transmitter and receiver of ultrasound waves;

c. a cathode ray tube;

d. means for displaying echo signals reflected by the heart walls at predetermined cross-section and received by said crystals on the screen of said cathode ray tube in a coordinate system wherein one coordinate represents the position of each of the crystals in said holder, and another coordinate represents the time of reception of said echo signals, and e. means for repeatedly and rapidly cyclically exciting certain ones of said crystals in a predetermined order and at such a frequency that an instantaneous image of said cross-section is displayed on the screen of said cathode ray tube.]

2. Apparatus as claimed in claim 1, comprising a clock generator for controlling the cyclic excitation of the said crystals; an amplifier controlled by said clock generator and having a time dependent gain; means for supplying said echo signals to said amplifier; and means for supplying an output signal of said amplifier to said cathode ray tube for modulating the intensity of the electron beam, the gain variation of said amplifier being selected in such manner so as to compensate for the intensity difference between the echo signals reflected by the front wall and the back wall of the heart.

3. [Apparatus as claimed in claim 1, comprising] *Apparatus for heart examination by means of ultrasound waves, comprising:*

*A. a crystal holder adapted to be externally placed on the body of a patient;*

*B. a first group of piezo-electric crystals supported in said holder, said crystals being arranged in a row and having an active surface lying in a common plane on the outside of the holder, said crystals having parallel axes of radiation lying in a plane adapted to intersect the heart being examined along a predetermined cross-section and forming both a transmitter and receiver of ultrasound waves;*

*c. a cathode ray tube;*

*d. means for displaying echo signals reflected by the heart walls at predetermined cross-section and received by said crystals on the screen of said cathode ray tube in a coordinate system wherein one coordinate represents the position of each of the crystals in said holder, and another coordinate represents the time of reception of said echo signals, and*

*e. means for repeatedly and rapidly cyclically exciting certain ones of said crystals in a predetermined order and at such a frequency that an instantaneous image of said cross-section is displayed on the screen of said cathode ray tube,* a second and third group of piezo-electric crystals arranged in two rows, said rows of first, second and third group of said crystals being juxtaposed in said holders; means for exciting the crystals of one group subsequent to the crystals of the other two groups; and means for superposing the echo signals received by the crystals of said second and third groups on the echo signals received by the crystals of said first group when said echo signals are displayed on the screen of said cathode ray tube, said groups being arranged in a manner so that, when said holder is placed on the body surface of a patient, the axes of radiation of the crystals of said first group are perpendicular to said body surface, and the axes of radiation of the crystals of said second and third groups are inclined with respect to said body surface at equal and opposite angles.

4. Apparatus as claimed in claim 3, comprising a first generator producing a step function indicating the position of each of said crystals in said holder, a second generator producing a saw tooth signal, a first amplifier for multiplying said saw tooth signal by a factor proportional to the [sinus] *sine* of the angle of radiation; a second amplifier for multiplying said saw tooth signal by a factor proportional to the [cosinus] *cosine* of the angle of radiation; an adding member for adding the output signal of said first amplifier to said step function; means for activating said first and second amplifiers and said adding member during the display of the echo signal received by the crystals of said second and third groups; means activated during the display of the echo signals received by the crystals of said first group for supplying said step function to said cathode ray tube as a vertical deflecting signal and for supplying said saw tooth signal to said cathode ray tube as a horizontal deflecting signal; and means activated during the display of the echo signals received by the crystals of said second and third groups for supplying the output signal of said adding member to said cathode ray tube as a vertical deflecting signal, and for supplying the output signal of said second amplifier to said cathode ray tube as a horizontal deflecting signal.

5. Apparatus as claimed in claim 4, the crystals of said three groups being displaced with respect to each other in said holder in the row direction; and means for supplying to said adding member a signal compensating for the mutual displacement of the groups of crystals.

*6. Apparatus for heart examination by means of ultrasound waves, comprising:*

*a. a crystal holder adapted to be externally placed on the body of a patient;*

*b. a first group of piezo-*electric crystals supported in said holder, said crystals being arranged in a row and having parallel axes of radiation lying in a plane adapted to intersect the heart being examined along a predetermined cross-*section and forming both a transmitter and receiver of ultrasound waves;*

*c. a cathode ray tube;*

*d. means for displaying echo signals reflected by the heart walls at the predetermined cross-section and received by said crystals on the screen of said cathode ray tube in a coordinate system wherein one coordinate represents the position of each of the crystals in said holder, and another coordinate represents the time of reception of said echo signals,*

*e. means for repeatedly and rapidly cyclically exciting certain ones of said crystals in a predetermined order and at such a frequency that an instantaneous image of said cross-section is displayed on the screen of said cathode ray tube, and*

*f. means for producing additional ultrasound radiation along axes inclined with respect to the parallel axes of radiation produced by said first group of crystals and for producing echo signals superimposed on the echo signals of said first group of crystals for providing an image on said screen of the entire outline of the heart including not only the front and back walls thereof but also the top and bottom walls as well.*

*7. Apparatus as claimed in claim 6 wherein said means for producing additional ultrasound radiation includes at least one further group of crystals having parallel axes of radiation which are inclined with respect to the axes of radiation of the first group of crystals.*

*8. Apparatus as claimed in claim 6 wherein said first and further group of crystals are arranged in parallel rows.*

*9. Apparatus as claimed in claim 6 wherein said first and further group of crystals are arranged in a common row.*

*10. Apparatus as claimed in claim 6 wherein said means for producing additional ultrasound radiation includes two further groups of crystals having axes of radiation inclined with respect to said first group.*

*11. Apparatus as claimed in claim 10 wherein the axes of radiation of the two further groups of crystals are inclined with respect to the first group at equal and opposite angles.*

*12. Apparatus as claimed in claim 6, comprising a clock generator for controlling the cyclic excitation of the said crystals; an amplifier controlled by said clock generator and having a time dependent gain; means for supplying said echo signals to said amplifier; and means for supplying an output signal of said amplifier to said cathode ray tube for modulating the intensity of the electron beam, the gain variation of said amplifier being selected in such manner so as to compensate for the intensity difference between the echo signals reflected by the front wall and the back wall of the heart.*

* * * * *